United States Patent [19]

Geri et al.

[11] Patent Number: 4,581,495

[45] Date of Patent: Apr. 8, 1986

[54] MODULAR TELEPHONE HOUSING

[75] Inventors: Don W. Geri, Moss Beach; Robert A. Wilk, Mi-Wuk Village, both of Calif.

[73] Assignee: Buscom Systems Inc., Santa Clara, Calif.

[21] Appl. No.: 606,305

[22] Filed: May 2, 1984

[51] Int. Cl.[4] .................. H04M 1/02; H04M 1/21; H01R 35/00; H05K 7/00

[52] U.S. Cl. .................... 179/179; 179/178; 179/100 R; 179/101; 339/17 F; 339/176 MF; 339/198 R; 361/393; 361/398

[58] Field of Search .............. 179/179, 178, 100 R, 179/101, 102, 98, 100 D; 339/198 H, 176 MF, 17 F; 361/393, 394, 395, 398

[56] References Cited

U.S. PATENT DOCUMENTS 3,521,008 7/1970 Tyson .................... 179/179
4,277,652 7/1981 Branden et al. .......... 179/179
4,375,584 3/1983 Mazumdar et al. ........ 179/178

Primary Examiner—Keith E. George
Assistant Examiner—Danita R. Byrd
Attorney, Agent, or Firm—Townsend and Townsend

[57] ABSTRACT

A modular telephone housing 12 adapted for structurally and electrically coupling to other like modular telephone housings. The housing includes two tapered ribs 60 and 62 disposed at one end thereof, and two corresponding tapered grooves 104 and 106 disposed at an opposite end thereof for mating with the tapered ribs of an adjacent modular telephone housing. A male connector 18 includes a plate 34 coupling to one end of a flat cable 16, a resilient backing strip 44 between the plate and the contact strip, and two alignment pins 46 and 48. A female connector 20 includes a plate 74 coupled to the other end of the flat cable, and two alignment slots 82 and 84.

20 Claims, 9 Drawing Figures

U.S. Patent  Apr. 8, 1986  Sheet 1 of 4  4,581,495
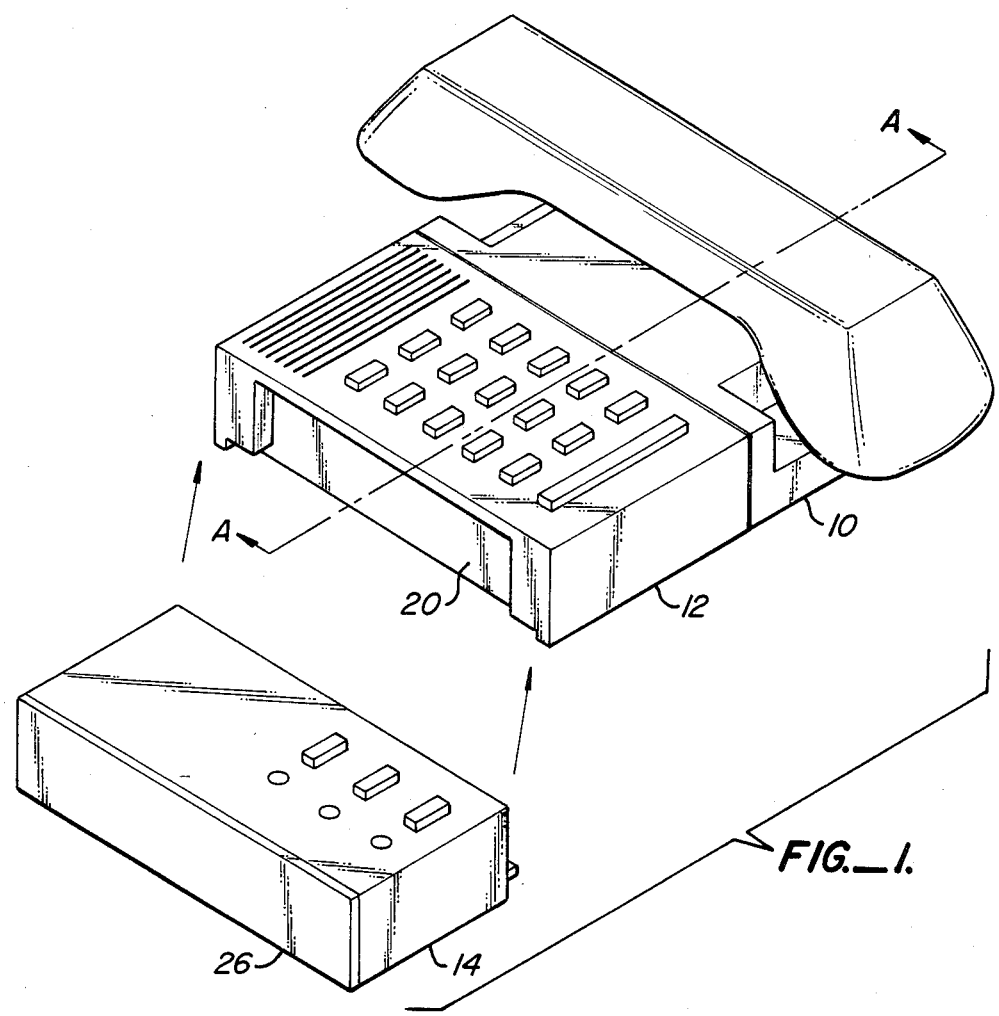
FIG._1.
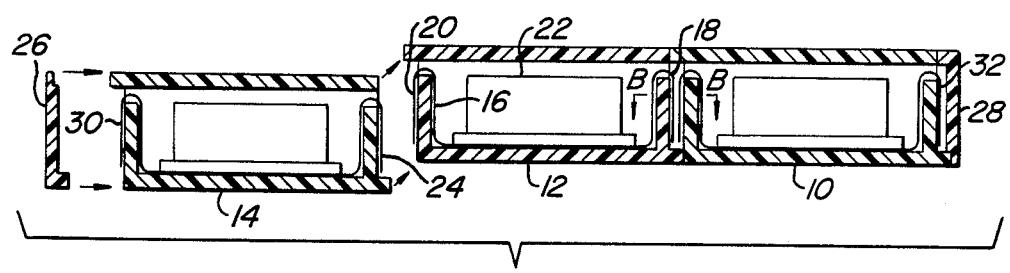
FIG._2.
SECTION A-A

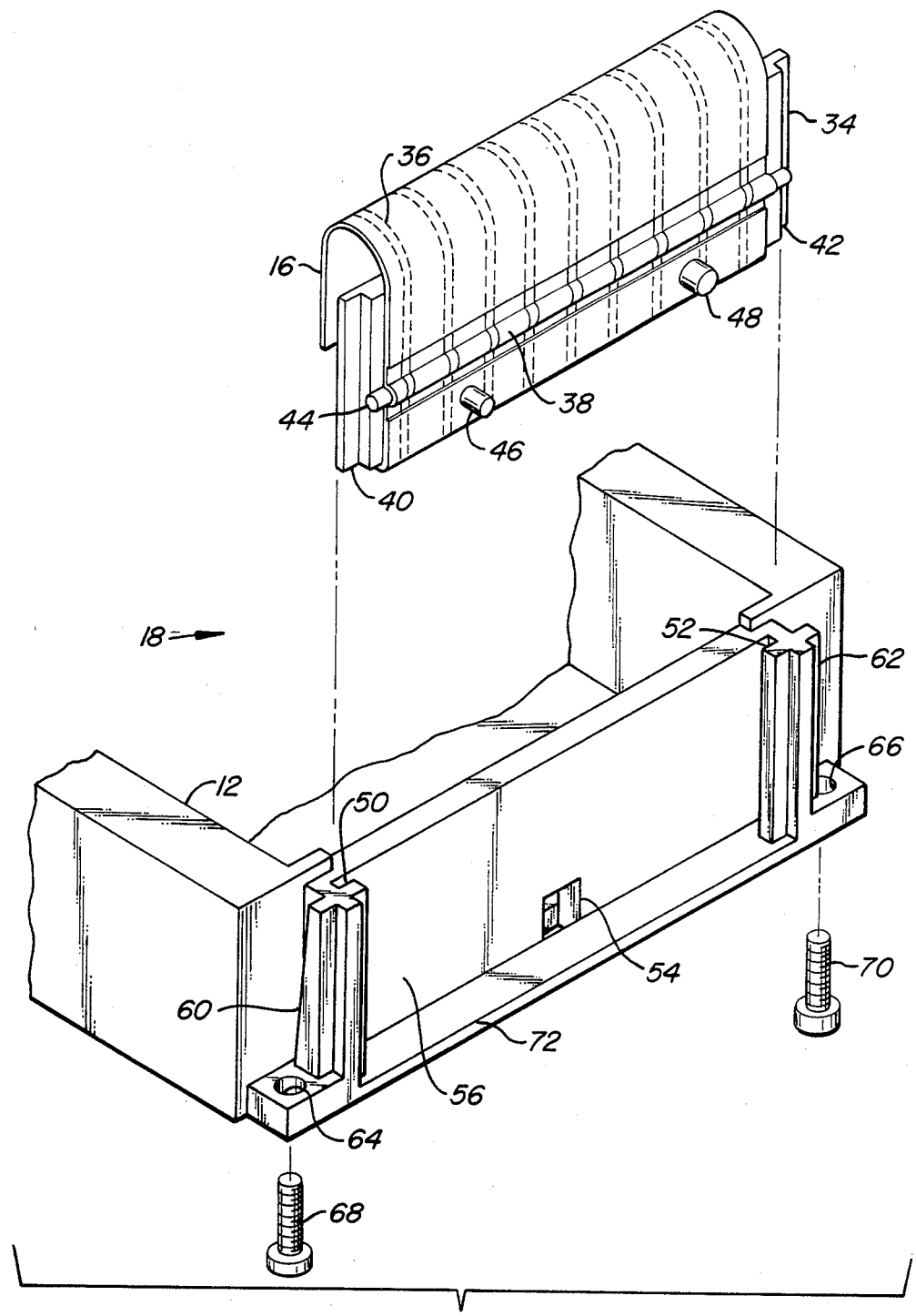
FIG._3.

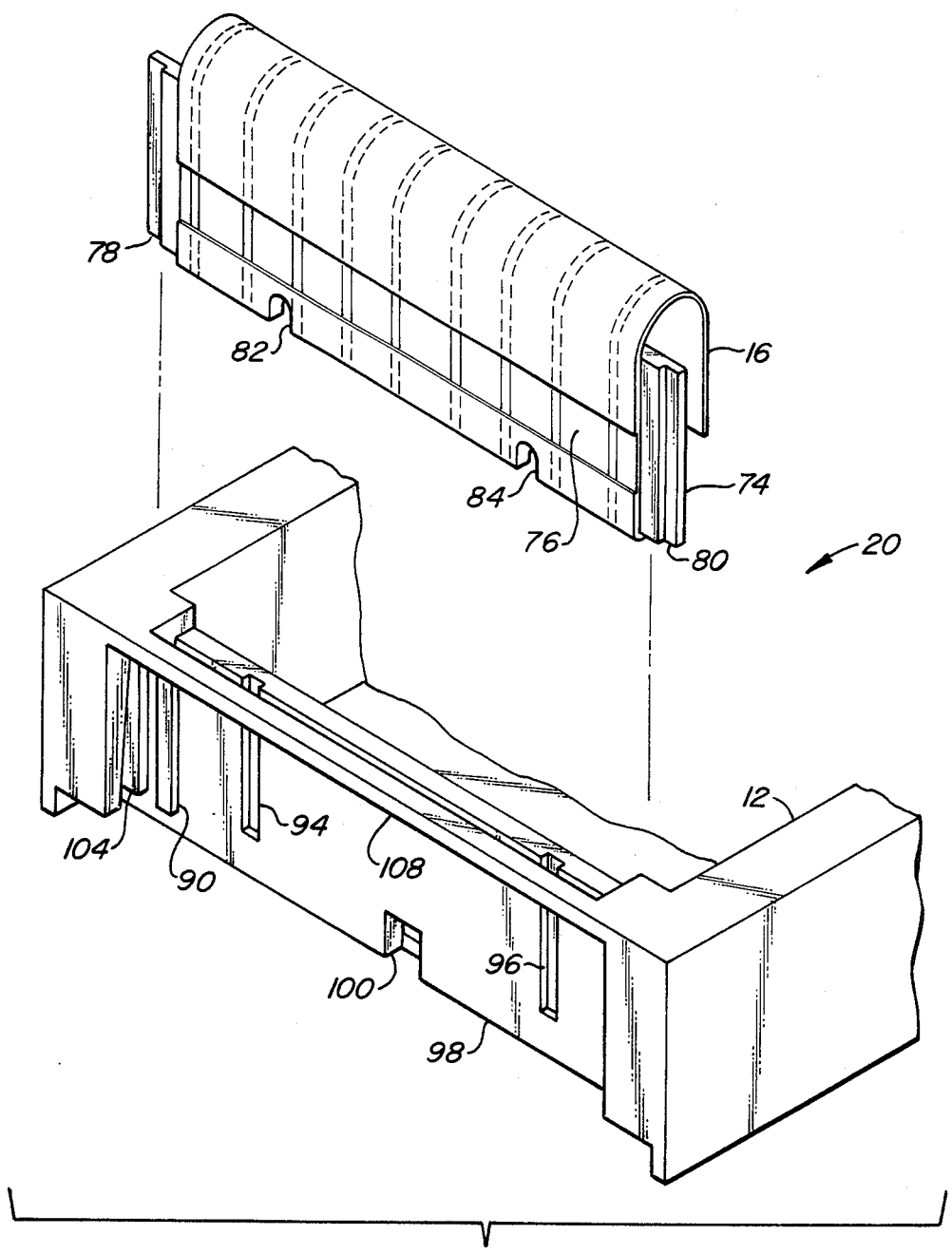
FIG._4.

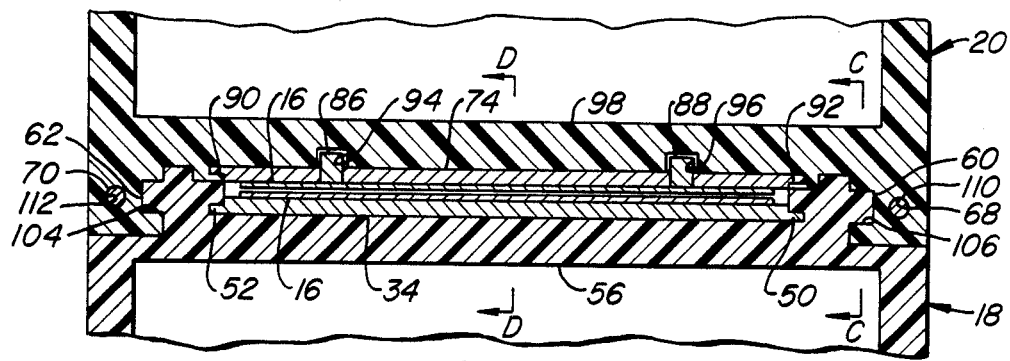
FIG._5.
SECTION B-B
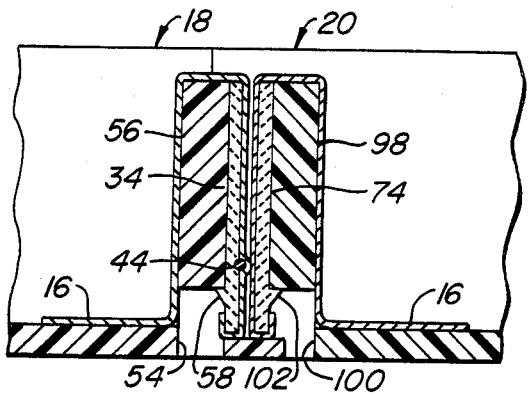
FIG._7.
SECTION D-D
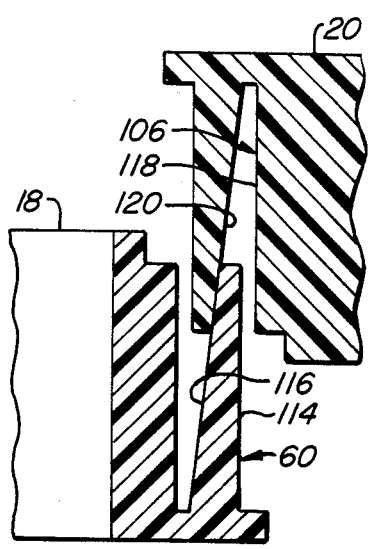
FIG._6a.
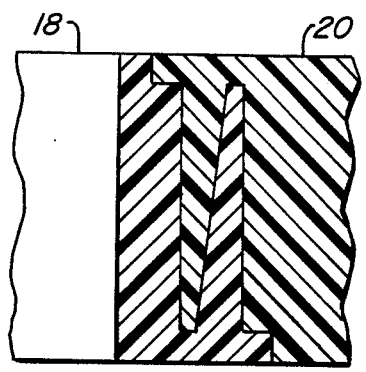
FIG._6b.
SECTION C-C
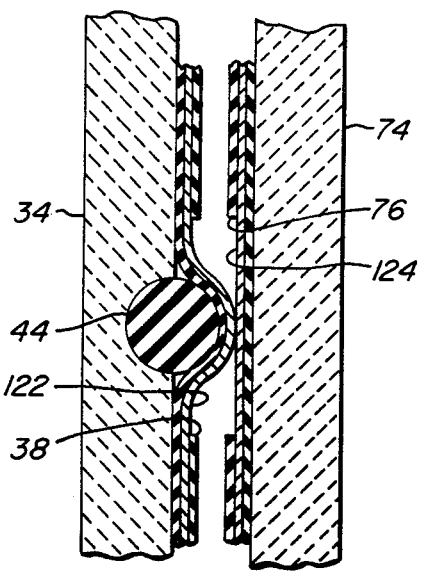
FIG._8.
SECTION D-D

MODULAR TELEPHONE HOUSING

BACKGROUND OF THE INVENTION

1. Field of the Invention

This invention relates generally to modular housings and connectors, and relates more particularly to a modular telephone housing adapted for structurally and electrically coupling to other like modular telephone housings.

2. Description of the Prior Art

A wide range of telephone products are available to telephone users. Product features such as touch-tone dialing, telephone number memory, and automatic redialing can be obtained in single telephone units. Some telephones incorporate additional features such as automatic call-forwarding and access to multiple outside lines. In addition, stand-alone devices such as answering machines, speaker telephones, and portable telephones add to the range of available telephone products.

Although many telephone products are available, choices are somewhat limited. If a customer desires a specific combination of features, it may be difficult to find a telephone that offers those specific features. Some telephones may have too few features, while others may have too many. The customer may end up buying a telephone with fewer features than desired, or may end up spending more money for a telephone with more features than desired.

Other problems arise in relation to the interconnection of telephones and stand-alone devices. Typically, each device is connected to an incoming telephone line as well as interconnected to other devices. Many of the devices may also require a separate electrical power connection. These electrical interconnections create an unsightly jumbled mass of wires.

SUMMARY OF THE INVENTION

The present invention provides a modular housing that is adapted for structurally and electrically coupling to other like modular housings. The modular housing includes a housing structure, a flat cable, a female connector, and a male connector. The housing structure accommodates an electrical device therein, and provides coupling means at each end of the housing for structurally mating with other similarly equipped housings. The flat cable includes multiple conductors that extend between the female and male connectors, and connect to the electrical device. The female and male connectors are disposed at opposite ends of the housing. At both the female and male connectors, the conductors of the flat cable are exposed within contact areas that extend across the width of the cable. When two housings are coupled, the contact areas of a male connector of one housing and a female connector of the other housing are juxtaposed. A resilient backing strip of the male connector causes the conductors within the contact area to bulge outwardly to establish electrical contact with corresponding conductors of the female connector.

Certain features of the housing structure provide coupling means for structurally mating with other similarly equipped housings. Two upwardly pointing tapered ribs are disposed at the male connector end of the housing. At the female connector end of the housing, two downwardly opening tapered grooves are disposed at the same spacing as that of the tapered ribs.

Certain features of the connectors provide means for aligning the conductors of the flat cables of two adjacent modular housings to be linked. The male connector includes a plate coupled to one end of the flat cable. The elongate backing strip is composed of a resilient material such as an elastomer. The backing strip is mounted on the plate behind the contact area of the flat cable, and causes the contact area to bulge outwardly. The plate also includes two alignment pins that protrude outwardly from the lower edge of the plate. The female connector includes a plate coupled to the other end of the flat cable. This plate has two alignment slots at its lower edge, with the spacing between the slots equal to the spacing between the alignment pins of the male connector. The housing includes means for laterally positioning and retaining these two plates.

To electrically and structurally join two adjacent modular housings, the male connector of one housing is inserted into the female connector of the other housing. In so doing, the tapered ribs of the male connector enter the tapered grooves of the female connector. As the male connector is inserted, alignment between the conductors of the two flat cables is provided by the alignment pins and slots of the plates. The tapered surfaces of the tapered ribs and grooves act to draw the two modular housings together, until the contact areas of the two flat cables are brought into contact. A contact force between the conductors of the flat cables is provided by the resilient backing strip, which compresses as the housings are coupled. When the male connector is fully inserted, the tapered ribs and grooves provide a structural connection between the housings and the contact areas provide an electrical connection between the flat cables. In addition, provisions are made for screw fasteners to join two coupled housings.

The preferred embodiment of the present invention is a modular telephone housing connection system that provides means for structurally and electrically interconnecting a series of telephonic devices. Each modular housing contains a telephonic device that performs one or more functions. A major advantage of the modular telephone housing of the present invention is that modular housings may be easily added, removed, or relocated. Electrical interconnections are formed automatically when mated. The present invention eliminates the jumbled mass of wires of prior art telephone systems and creates a unified and attractive structure. A telephone user can create a customized telephone system by selecting appropriate modular housings. In addition, a telephone system constructed according to the present invention may be easily expanded at any time.

BRIEF DESCRIPTION OF THE DRAWINGS

FIG. 1 is a perspective view of three modular telephone housings according to the present invention.

FIG. 2 is a side elevation sectional view of three modular housings, and is taken along section line A—A of FIG. 1.

FIG. 3 is a perspective view of a male connector of the modular housing of the present invention.

FIG. 4 is a perspective view of a corresponding female connector of the modular housing.

FIG. 5 is a top plan sectional view of two coupled modular housings, and is taken along section line B—B of FIG. 2.

FIGS. 6a and 6b are side elevation sectional views taken along section line C—C of FIG. 5. FIG. 6a shows two partially coupled modular housings, while FIG. 6b shows two fully coupled modular housings.

FIG. 7 is a side elevation sectional view of two coupled modular housings, and is taken along section line D—D of FIG. 5.

FIG. 8 is an enlarged sectional view of a portion of the side elevation sectional view of FIG. 7.

DETAILED DESCRIPTION OF THE PREFERRED EMBODIMENT

The preferred embodiment of the present invention is a modular telephone housing with male and female flat cable connectors that is adapted for structurally and electrically coupling with the male or female cable connector of other like modular telephone housings. In FIG. 1, three modular telephone housings 10, 12, and 14 are shown. Modular housing 10, a telephone handset, and modular housing 12, a dialing keypad, combine to form a basic telephone. Each module 10, 12 or 14 is provided with a female connector and a male connector. Additional modular housings, such as housing 14, may be added to both the left and right sides of the basic telephone. The female connector of one module is matingly engaged to the male connector of the adjoining module. Such additional housings contain additional telephonic devices that expand the functional capabilities of the telephone. For example, modular housing 14 provides access to three outside telephone lines.

In FIG. 2, the three modular housings 10, 12, and 14 are shown in schematic form. Each modular housing includes a flat cable 16 that extends from a male connector 18 to a female connector 20. The flat cable also provides electrical connections to an electrical device 22 packaged within the modular housing.

Two modular housings are coupled together by mating the male connector of one to the female connector of the other. To couple modular housing 14 to modular housing 12, male connector 24 of modular housing 14 is inserted into female connector 20 of modular housing 12 from below. This is accomplished by moving modular housing 14 in a generally upward direction with respect to modular housing 12. When so installed, the flat cables of the three modular housings provide a continuous conductive path throughout the resulting assembly. End caps 26 and 29 are provided to cover and protect exposed connectors 30 and 32 at the ends of the assembly.

In FIGS. 3 and 4, the male and female connectors of the modular housing are shown in greater detail. Referring in particular to FIG. 3, male connector 18 includes certain structural features of one end of modular housing 12, and also includes a plate 34 coupled to one end of flat cable 16.

Flat cable 16 is similar to flat cables commonly used in the electronics industry for providing multiple electrical conductors. Each conductor 36 is a flat ribbon of metal that runs the length of the flat cable. The conductors are parallel and laterally spaced apart across the width of the flat cable. Insulation is typically provided by two insulative layers that sandwich the conductors between them. A strip of the insulation is removed to expose the conductors at the male connector end of the flat cable, forming a contact area 38. When another modular housing is coupled to modular housing 12, contact area 38 establishes electrical contact with the flat cable of the adjacent modular housing.

Plate 34 is generally rectangular in shape, with shoulders 40 and 42 formed along two sides. An elongate resilient backing strip 44 is mounted in a groove in the outer face of the plate. The backing strip is composed of an elastomeric material, such as rubber. Backing strip 44 is preferably cylindrical in shape. The flat cable is bonded to the outer face of the plate, with the end of the cable looping under the lower edge of the plate. The flat cable is oriented such that the backing strip is directly behind contact area 38. The backing strip causes the contact area to bulge outwardly. Two alignment pins 46 and 48 protrude outwardly from the lower portion of plate 34.

Certain features at the male connector end of the modular housing 12 provide means for mounting plate 34. Two rails 50 and 52 in the modular housing provide lateral positioning for the plate. A slot 54 is provided at the lower edge of vertical side wall 56. When plate 34 is fully inserted into rails 50 and 52, a tab 58 (see FIG. 7) in the back side of plate 34 enters slot 54 to retain the plate in the modular housing.

Other features at the male connector end of the modular housing 12 provide means for structurally coupling the modular housing to the female connector of another modular housing. Two vertically oriented tapered ribs 60 and 62 are disposed outside of rails 50 and 52. Two clearance holes 64 and 66 are provided for screw fasteners 68 and 70, which are threaded into the adjacent modular housing to join the two together. A member 72 protrudes horizontally from the lower edge of wall 56 for enclosing and protecting the underside of the connectors.

Referring now to FIG. 4, female connector 20 includes certain structural features of the opposite end of modular housing 12, and also includes a plate 74 coupled to the opposite end of flat cable 16. A strip of insulation is removed from this end of flat cable 16 to form a contact area 76. Plate 74 is generally rectangular in shape, with shoulders 78 and 80 formed along each side. The flat cable is bonded to the outer face of the plate, with the end of the cable looping under the lower edge of the plate. Two alignment slots 82 and 84 open downward at the lower edge of plate 74. Two pins 86 and 88 protrude from the back side of plate 74 (see FIG. 5)

Certain features at the female connector end of the modular housing 12 provide means for mounting plate 74. Two rails 90 and 92 (see FIG. 5) form grooves into which shoulders 78 and 80 are inserted to provide lateral positioning for the plate. In addition, two grooves 94 and 96 in the outer face of vertical side wall 98 mate with pins 86 and 88 at the back side of plate 74 to provide additional lateral positioning. A slot 100 is provided at the lower edge of vertical side wall 98. A tab 102 (see FIG. 7) in the back side of plate 74 enters the slot to retain the plate in the modular housing.

Other features at the female connector end of the modular housing provide means for structurally coupling the modular housing to a male connector of another modular housing. Two tapered grooves 104 and 106 (see FIG. 5) are parallel and are oriented generally vertically with a downward facing opening. A member 108 protrudes horizontally from the top edge of modular housing 12 for enclosing and protecting the top side of the connectors.

FIGS. 5, 6a, 6b, 7, and 8 are sectional views that more clearly illustrate the cooperation of the various elements described above. In reference to FIG. 5, it can be seen that rails 50 and 52, and rails 90 and 92 laterally constrain plates 34 and 74, respectively. Also, pins 94 and 96 are laterally captured by grooves 86 and 88 to laterally constrain plate 74. It can also be seen that tapered ribs 60 and 62 of male connector 18 are coupled with tapered grooves 104 and 106 of female connector 20. In addition, screw fasteners 68 and 70 engage holes 110 and 112 in female connector 20 to join the male connector to the female connector.

In reference now to FIGS. 6a and 6b, the operation of the tapered pins and grooves will now be described. Tapering pin 60 has a vertical surface 114 and an inwardly facing slanted surface 116. Correspondingly, tapered groove 106 also has a vertical surface 118 and an inwardly facing slanted surface 120. When the male connector 18 is first inserted into the female connector 20, the upper tip of the tapered pin enters into the tapered groove, as shown in FIGS. 6a. As insertion of the male connector continues, the male connector moves upward in a generally vertical direction. Since the slanted surface 116 of the rib and the slanted surface 120 of the groove are in contact, the distance between the connectors decreases as the insertion continues. Finally, when male and female connectors are fully mated, the connectors are positioned as shown in FIG. 6b. Accordingly, the tapered pins and grooves operate to urge the male and female connectors together during coupling.

Prior to the coupling of the male and female connectors, there is no electrical connection between adjacent modular housings. As the male connector 18 is inserted into the female connector 20, alignment pins 46 and 48 are inserted into alignment slots 84 and 82, respectively. This laterally aligns the contact areas 38 and 76 with respect to each other before contact is made between the conductors of the flat cables. As shown in FIG. 3, alignment pin 46 is smaller than alignment pin 48 to accommodate tolerances in the dimensions of the slots and pins. The use of pins and slots to align plates 34 and 74 permits clearances between the plates and their respective rails 50, 52, 90, and 92 without affecting the alignment of the conductors.

After the contact areas are aligned, but before the male and female connectors are fully coupled, the conductors within the two contact areas make contact. As the insertion of the male connector continues, the conductors wipe across each other. This wiping action breaks through any oxide or other contamination on the surfaces of the conductors to establish a good metal-to-metal contact between the conductors.

When the male and female connectors are fully coupled, the backing strip 44 is compressed, as shown in FIGS. 7 and 8. As noted above, the backing strip 44 causes the contact area 38 of the male connector to bulge outwardly. When the male and female connectors are fully coupled, the vertical side walls 56 and 98 of the connectors hold the plates 34 and 74 in fixed relation to each other. This compresses the backing strip and ensures an adequate contact force between conductors 122 and 124, as shown in FIG. 8.

After the male and female connectors are fully coupled, screw fasteners 68 and 70 (FIG. 3) are inserted through holes 64 and 66 of the male connector, and are threaded into holes 110 and 112 (FIG. 5) of the female connector. The fasteners maintain the structural coupling between the adjacent modular housing. To decouple the modular housings, the screws are removed and the male connector is lowered from the female connector.

From the above description, it will be apparent that the invention disclosed herein provides a novel and advantageous apparatus for a modular housing with male and female flat cable connectors that is adapted for structurally and electrically coupling to other like modular housings. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A modular telephone housing adapted for structurally and electrically coupling to other like modular telephone housings, said modular telephone housing comprising:
   a housing structure for accomodating a telephonic device, said housing structure including first and second housing coupling means respectively disposed at first and second ends of said housing structure for structurally coupling to corresponding housing coupling means of other modular telephone housings;
   a flat cable having parallel and spaced-apart conductors between two insulative layers, disposed within said housing structure for providing electrical connection to said telephonic device, said cable having a plurality of conductors disposed between first and second ends thereof;
   a first connector including a first plate, coupled to said first end of said cable opposite a first contact area, wherein portions of said conductors are exposed within said first contact area thereof, and means for coupling said first plate to said housing structure; and
   a second connector, including a second plate, disposed at said second end of said housing structure with said second plate coupled to said second end of said cable at a second contact area thereof, wherein portions of said conductors are exposed within said second contact area, and means for coupling said second plate to said housing structure, said second contact area being juxtaposed in fixed relation to a first contact area of a coupled modular telephone housing, said second connector including an elongate backing strip operable for urging said second contact area outwardly to establish electrical contact between said conductors and corresponding conductors of said coupled modular telephone housing.

2. A housing as recited in claim 1 wherein said first housing coupling means comprises tapered grooves affixed to said first end of said housing structure and flanking said first connector, and wherein said second housing coupling means comprises tapered ribs affixed to said second end of said housing and flanking said second connector, said tapered grooves and ribs being operable for structurally coupling with respective tapered ribs and grooves of other modular telephone housings.

3. A housing as recited in claim 2 wherein said first housing coupling means further comprises screw receiving means, and wherein said second housing coupling means further comprises screw fastening means operable for coupling with screw receiving means of a coupled modular telphone housing.

4. A housing as recited in claim 2 wherein said tapered grooves have inwardly facing surfaces that are inclined from vertical, and wherein said tapered ribs have inwardly facing surfaces that are also inclined from vertical by a corresponding amount such that contacting inclined surfaces operate to draw two housings together as they are coupled.

5. A housing as recited in claim 1 wherein said means for coupling said first plate to said housing structure includes parallel rails coupled to said housing structure for laterally positioning said first plate, and also includes a tab coupled to said first plate and a slot disposed in said housing structure and operable for receiving said tab to retain said first plate.

6. A housing as recited in claim 1 wherein said means for coupling said second plate to said housing structure includes parallel rails coupled to said housing structure for laterally positioning said second plate, and also includes a tab coupled to said second plate and a slot disposed in said housing structure and operable for receiving said tab to retain said second plate.

7. A housing as recited in claim 1 wherein said first and second connectors respectively include first and second cable alignment means coupled thereto for aligning said conductors of said cable with conductors of a coupled modular telephone housing.

8. A housing as recited in claim 7 wherein said first cable alignment means includes two slots disposed in said first plate, and wherein said second alignment means includes two corresponding pins affixed to said second plate.

9. A housing as recited in claim 1 wherein said portions of said insulative layers are removed to form said first and second contact areas.

10. A housing as recited in claim 1 wherein said elongate backing strip comprises a resilient material and is disposed between said second plate and said cable.

11. A housing as recited in claim 10 wherein said elongate backing strip is cylindrical in shape, and is coupled to a transverse groove in said second plate.

12. A modular housing adapted for structurally and electrically coupling to other like modular housings, said modular housing comprising:
   a housing structure for accommodating an electrical device, said housing structure including first and second housing coupling means respectively disposed at first and second ends of said housing structure for structurally coupling to corresponding housing coupling means of other modular housings;
   a flat cable disposed within said housing for providing electrical connection to said electrical device, said flat cable having a plurality of spaced-apart parallel conductors disposed between first and second ends thereof;
   a first connector including a first plate, disposed at said first end of said housing structure with said first plate coupled to said first end of said flat cable opposite a first contact area thereof, wherein portions of said conductors are exposed within said first contact area, and means for coupling said first plate to said housing structure; and
   a second connector including a second plate, disposed at said second end of said housing structure, said second plate coupled to said second end of said flat cable opposite a second contact area thereof, wherein portions of said conductors are exposed within said second contact area thereof, and means for coupling said second plate to said housing structure, said second contact area being juxtaposed in fixed relation to a first contact area of a coupled modular housing, said second connector including an elongate and resilient backing strip operable for urging said second contact area outwardly to establish electrical contact between said conductors and corresponding conductors of said coupled modular housing.

13. A housing as recited in claim 12 wherein said first and second connectors respectively include first and second cable alignment means coupled thereto for aligning said conductors of said flat cable with conductors of a coupled modular housing.

14. A housing as recited in claim 13 wherein said first cable alignment means includes two slots disposed in said first plate, and wherein said second alignment means includes two corresponding pins affixed to said second plate.

15. A housing as recited in claim 12 wherein said conductors of said flat cable are disposed between two insulative layers, and wherein portions of said insulative layers are removed to form said first and second contact areas.

16. A housing as recited in claim 12 wherein said elongate backing strip comprises an elastomeric material and is disposed between said second plate and said cable.

17. A housing as recited in claim 16 wherein said elongate backing strip is cylindrical in shape, and is coupled to a transverse groove in said second plate.

18. A modular housing adapted for structurally and electrically coupling to other like modular housings, said modular housing comprising:
   a housing structure for accommodating an electrical device;
   a flat cable disposed within said housing for providing electrical connection to said electrical device, said flat cable having a plurality of spaced-apart parallel conductors disposed between first and second ends thereof;
   first connector means, including a first plate, disposed at a first end of said housing structure with said first plate coupled to said first end of said flat cable opposite a first contact area thereof wherein portions of said conductors are exposed within said first contact area, and means for coupling said first plate to said housing structure;
   two tapered grooves coupled to said housing structure and flanking said first plate of said first connector means;
   second connector means, including a second plate, disposed at a second end of said housing structure with said second plate coupled to said second end of said cable at a second contact area thereof, wherein portions of said conductors are exposed within said second contact area, and means for coupling said second plate to said housing structure; and
   two tapered ribs coupled to said housing structure and flanking said second plate of said second connector means, said tapered ribs being operable for engaging tapered grooves of another modular housing for structurally coupling to said other modular housing and for juxtaposing said second connector means in fixed relationship with a corresponding first connector means of said other modular housing to establish electrical contact therebetween.

19. A housing as recited in claim 18 further comprising screw receiving means disposed at said first end of said housing structure, and screw fastening means coupled to said second end of said housing structure and operable for coupling with corresponding screw receiving means of a coupled modular housing.

20. A housing as recited in claim 18 wherein said tapered grooves have inwardly facing surfaces that are inclined from vertical, and wherein said tapered ribs have inwardly facing surfaces that are also inclined from vertical by a corresponding amount such that contacting inclined surfaces operate to draw two housings together as they are coupled.

* * * * *